US012493702B2

(12) United States Patent
Sethi et al.

(10) Patent No.: US 12,493,702 B2
(45) Date of Patent: Dec. 9, 2025

(54) CONTEXTUAL ENCRYPTION AND ACCESS CONTROL OF DATA

(71) Applicant: Dell Products L.P., Round Rock, TX (US)

(72) Inventors: Parminder Singh Sethi, Punjab (IN); Shelesh Chopra, Bangalore (IN); Srinath Kappgal, Cork (IE); Atishay Jain, Meerut (IN)

(73) Assignee: Dell Products L.P., Round Rock, TX (US)

( * ) Notice: Subject to any disclaimer, the term of this patent is extended or adjusted under 35 U.S.C. 154(b) by 202 days.

(21) Appl. No.: 18/453,698

(22) Filed: Aug. 22, 2023

(65) Prior Publication Data
US 2025/0068745 A1 Feb. 27, 2025

(51) Int. Cl.
*G06F 21/60* (2013.01)
(52) U.S. Cl.
CPC .................. *G06F 21/602* (2013.01)
(58) Field of Classification Search
CPC ............... G06F 21/602; G06F 21/6218; G06F 2221/2111
See application file for complete search history.

(56) References Cited

U.S. PATENT DOCUMENTS

| 2014/0188804 | A1* | 7/2014 | Gokhale | G06F 21/6218 707/645 |
| 2020/0074091 | A1* | 3/2020 | Jain | H04L 9/0894 |
| 2021/0125083 | A1* | 4/2021 | Ogawa | G06N 20/00 |
| 2022/0078194 | A1* | 3/2022 | Grover | H04L 63/0457 |
| 2024/0070303 | A1* | 2/2024 | Lovmand | G06F 21/6209 |

* cited by examiner

*Primary Examiner* — Sangseok Park
(74) *Attorney, Agent, or Firm* — Chamberlain, Hrdlicka, White, Williams & Aughtry; Aly Z. Dossa

(57) ABSTRACT

A method for enhancing data security includes receiving data. The method includes obtaining a plurality of contextual factors associated with the data. The further method includes determining an encryption level based on at least one of the contextual factors. The method further includes determining a type of encryption based on the encryption level. The method further includes encrypting the data using the type of encryption to generate encrypted data. The method further includes associating an access control level with the encrypted data to generate associated encrypted data. The method also includes determining a storage location for the associated encrypted data based on the encryption level, wherein determining the storage location is based on a data sensitivity associated with the data or a compliance rule. The method further includes sending the associated encrypted data to the storage location.

16 Claims, 5 Drawing Sheets

CONTEXTUAL ENCRYPTION AND ACCESS CONTROL OF DATA

BACKGROUND

Computing devices may provide services. To provide the services, the computing devices may include hardware components and software components. The software components may store information usable to provide the services using the hardware components. When storing the information, the data may be encrypted. Such encryption may be adjusted based on the data.

SUMMARY

In general, embodiments described herein relate to a method for enhancing data security. The method includes receiving data. The method further includes obtaining a plurality of contextual factors associated with the data, wherein the contextual factors comprises one or more of the following: user location, device type, network conditions, user identity, time of day, application type, and user behavior. Also, the method includes determining an encryption level based on at least one of the contextual factors. Moreover, the method includes determining a type of encryption based on the encryption level. In addition, the method includes encrypting the data using the type of encryption to generate encrypted data. Further, the method includes associating an access control level with the encrypted data to generate associated encrypted data. The method also includes determining a storage location for the associated encrypted data based on the encryption level, wherein determining the storage location is based on a data sensitivity associated with the data or a compliance rule. The method further includes sending the associated encrypted data to the storage location.

In general, embodiments described herein relate to a method for enhancing data security. The method includes receiving data. The method also includes obtaining a plurality of contextual factors associated with the data. The method also includes determining an encryption level based on at least one of the contextual factors. The method includes determining a type of encryption based on the encryption level. In addition, the method includes encrypting, by an encryption module on a device, the data using the type of encryption to generate encrypted data. Further, the method includes associating an access control level with the encrypted data. The method also includes determining a storage location for the encrypted data based on the encryption level. The method further includes initiating sending of the encrypted data to the storage location.

In general, embodiments described herein relate to a method for enhancing data security using an encryption module. The method includes receiving data. The method further includes obtaining a plurality of contextual factors associated with the data. The method also includes determining an encryption level based on at least one of the contextual factors. The method also includes determining a type of encryption based on the encryption level. The method also includes encrypting the data using the type of encryption to generate encrypted data.

BRIEF DESCRIPTION OF DRAWINGS

Certain embodiments will be described with reference to the accompanying drawings. However, the accompanying drawings illustrate only certain aspects or implementations by way of example and are not meant to limit the scope of the claims.

Specific embodiments will now be described with reference to the accompanying figures.

DETAILED DESCRIPTION

Figure 1:
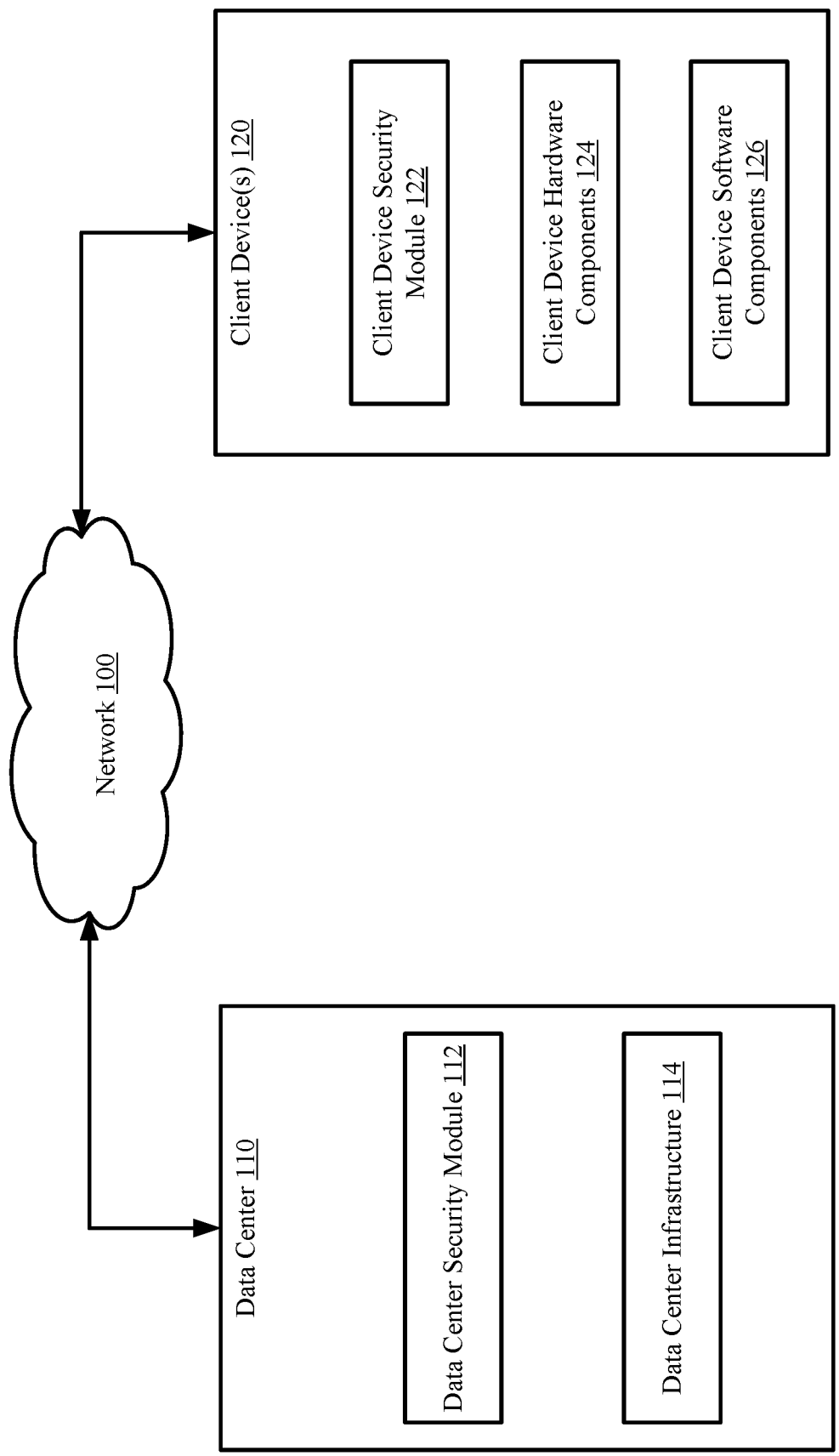
FIG. 1 shows a diagram of a system in accordance with one or more embodiments.

In the below description, numerous details are set forth as examples of embodiments described herein. It will be understood by those skilled in the art, and having the benefit of this Detailed Description, that one or more embodiments of the embodiments described herein may be practiced without these specific details and that numerous variations or modifications may be possible without departing from the scope of the embodiments described herein. Certain details known to those of ordinary skill in the art may be omitted to avoid obscuring the description.

In the below description of the figures, any component described with regard to a figure, in various embodiments described herein, may be equivalent to one or more like-named components described with regard to any other figure. For brevity, descriptions of these components will not be repeated with regard to each figure. Thus, embodiments of the components of each figure are incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

An increase in the amount of sensitive data being generated on devices and transmitted over networks has created a need for enhanced data security measures. Traditional encryption methods use a fixed level of encryption that may not be sufficient to protect data from becoming compromised. Fixed levels of encryption become insufficient when different contextual situations arise, such as user location or network conditions. This limitation can lead to unauthorized access to sensitive data, resulting in potential security breaches and data loss.

As such, there exists a desire for a dynamic encryption technique that is capable of adjusting the level of encryption based on contextual factors. Contextual factors include location data, which can indicate the user location, device type, network conditions, user identity, time of day, application type, and user behavior. The contextual encryption system adapts to different contextual situations that provides a higher level of security for sensitive data when appropriate. Additionally, the contextual encryption system has the potential to reduce data transfer times and improve user experience by adjusting the encryption level appropriately. Further, the flexibility and adaptability of the contextual encryption system to different contextual situations represents a novel approach to data security.

The following describes one or more embodiments.

FIG. 1 shows a diagram of a system in accordance with one or more embodiments. The system includes a network (100), a data center (110) and any number of client devices (120). The system may include additional, fewer and/or different components without departing from the scope disclosed herein. Each component may be operably connected to any of the other components via any combination of wired and/or wireless connections. Each component illustrated in FIG. 1 is discussed below.

In one or more embodiments, the data center (110) and the client device(s) (120) may be in communication with one another via the network (100). In one or more embodiments, a data center security module (112), and a data center infrastructure (114) may collectively be referred to as "components of the data center (110)". Similarly, in one or more embodiments, a client device security module (122), client device hardware components (124) and client device software components (126) may collectively be referred to as "components of the client device(s) (120)".

In one or more embodiments, the data center (110) is operably connected to the client device(s) (120) via the network (100), in which the network may allow the data center (e.g., components of the data center (110)) to communicate with the client device(s) (120) (e.g., components of the client device(s) (120)).

In one or more embodiments, the network (100) may represent a computing network configured for computing resource and/or messages exchange among registered computing hosts. As discussed above, components of the system may operatively connect to one another through the network (100) (e.g., a LAN, a WAN, a mobile network, a wireless LAN (WLAN), etc.). In one or more embodiments, the network (100) may be implemented using any combination of wired and/or wireless network topologies, and the network (100) may be operably connected to the Internet or other networks. Further, the network (100) may enable interactions between the data center (110) through any number and types of wired and/or wireless network protocols (e.g., TCP, UDP, Internet Protocol version 4 (IPv4), etc.).

In one or more embodiments, as being a physical computing device or a logical computing device (e.g., a Virtual Machine), a data center (e.g., 110) may be configured for hosting and maintaining various workloads, and/or for providing a computing environment (e.g., computing power and storage) whereon workloads may be implemented. In general, a data center's (e.g., a site's, a node's, etc.) infrastructure is based on a network of computing and storage resources that enable the delivery of shared applications and data. For example, a data center (e.g., 110) of an organization may exchange data with other data centers of the same organization registered in/to a network in order to, for example, participate in a collaborative workload placement. As yet another example, a data center (e.g., 110) may split up a request (e.g., an operation, a task, an activity, etc.) with another data center, coordinating its efforts to complete the request (e.g., to generate a response) more efficiently than if the data center (e.g., 110) had been responsible for completing the request. One of ordinary skill will appreciate that a data center (e.g., 110) may perform other functionalities without departing from the scope of the invention.

In one or more embodiments, a data center (e.g., 110) may be capable of providing the aforementioned functionalities/services to the user of the client device(s) 120. However, not all of the users may be allowed to receive all of the services. For example, the priority (e.g., the user access level) of a user may be used to determine how to manage computing resources within a data center (e.g., 110) to provide services to that user. As yet another example, the priority of a user may be used to identify the services that need to be provide to that user. As yet another example, the priority of a user may be used to determine how quickly communications (for the purposes of providing services in cooperation with the network (and its subcomponents)) are to be processed by the network.

In one or more embodiments, a data center (e.g., 110) includes data center infrastructure (114), which includes, for example (but not limited to): a router, a switch, a firewall, a security module, a storage infrastructure, a server, an application-delivery controller, a network device, etc. The aforementioned components of the data center infrastructure (114) generally relate to computing, storage, and networking resources that enable the delivery of shared applications and data. A data center (e.g., 110) may support business application and activities (e.g., actions, behaviors, etc.) that include, for example (but not limited to): email and asset (e.g., a file, a folder, etc.) sharing, one or more production workloads, customer relationship management, enterprise resource planning, artificial intelligence (AI)/machine learning (ML)-based activities, virtual desktop infrastructure (VDI) environments, collaboration services, etc.

In one or more embodiments, (i) the networking resources include at least network infrastructure (which connects servers (physical and/or virtualized), data center services, storage, and external connectivity to end-user locations (e.g., client device(s) (120))), (ii) storage resources include at least storage infrastructure, and (iii) computing resources include at least processing, memory, local storage, network connectivity, etc. that drive applications.

In one or more embodiments, the data center (110) includes the data center security module (112) that may be the same as the security module (200) discussed in detail below.

In one or more embodiments, the client device(s) (120) represents any physical device or computing system. In one or more embodiments, client device hardware components (124) refer to the physical parts of the client device (e.g., screen, central processing unit (CPU), storage). In one or more embodiments, client device software components (126) refer to the set of programs and instructions stored on the client device to perform specific tasks. In one or more embodiments, client device(s) (120) includes the client device security module (122) that may be the same as the security module (200, FIG. 2) discussed in detail below.

Figure 2:
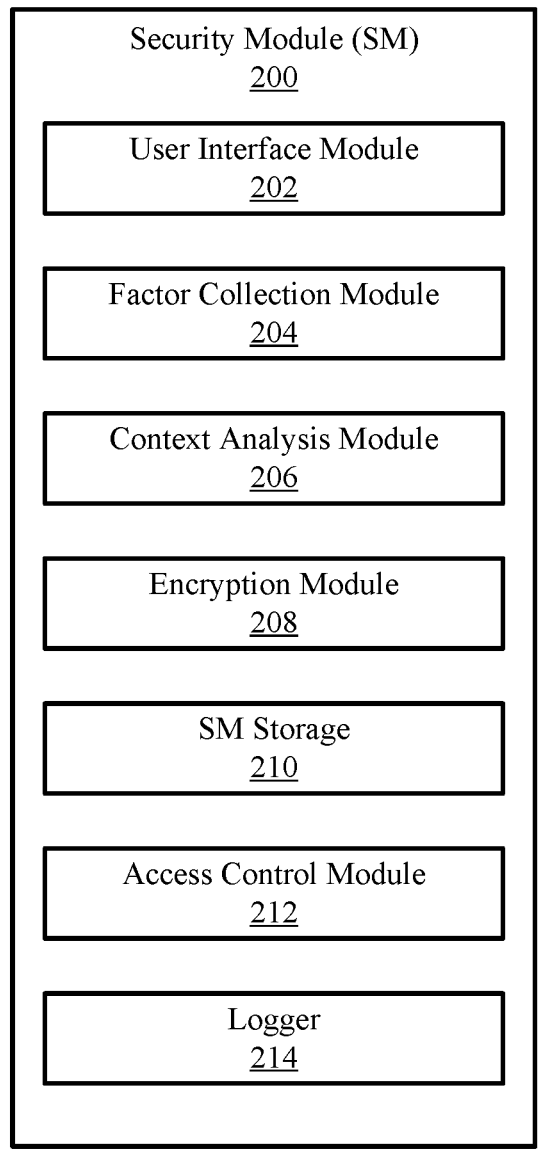
FIG. 2 shows a diagram of a security module in accordance with one or more embodiments.

FIG. 2 shows a diagram of a security module (SM) (200) in accordance with one or more embodiments. The SM (200) includes a user interface module (202), a factor collection module (204), a context analysis module (206), an encryption module (208), an SM storage (210), an access control module (212), and a logger (214). The SM (200) may include additional, fewer, and/or different components without departing from the scope disclosed herein. Each component illustrated in FIG. 2 is discussed below.

In one or more embodiments, the user interface module (202) is an interface through which users interact with the SM (200). In one or more embodiments, the user interface module (202) serves as an entry point for user input, triggering the data generation process. In one or more embodiments, user input includes a user typing in a message and/or a user filling out a form on a website. Further, in one or more embodiments, the user interface module (202) provides a user-friendly interface for data transmission and access control.

In one or more embodiments, the factor collection module (204) collects the contextual factors of the data. In one or more embodiments, the contextual factors are obtained from a geolocation device, metadata, networking data, system information, analyzing user inputs, and/or analyzing any other parameter associated with the data. Contextual factors include one or more of the following: location data, device type, network conditions, user identity, time of day, application type, and user behavior. Location data includes the geographic location associated with the data, which may be determined via metadata associated with the data or by a location associated with a client device (e.g., 120, FIG. 1), which may be based on an internet protocol address or geolocation data. Device type includes the type of device being used (e.g., laptop, smartphone). Network conditions relate to the quality and/or reliability of the network connection, and may be based on signal strength, latency, and/or packet loss. User identity includes the identity of the user which may include a role of the user within an organization and/or the user access control level. Time of day includes the time of day when the data is generated. Application type includes the type of application being used. User behavior includes user behavior patterns, which may be based on a rate of data entry by a user and/or a timing of access by the user. In addition, in one or more embodiments, the user may input settings relating to the types of encryption for each encryption level, the levels of encryption associated with certain contextual factors, which may be customized by the user, and/or the access control levels needed to access encrypted data.

In one or more embodiments, the context analysis module (206) analyzes the collected contextual factors to determine the appropriate encryption level for data transmissions and/or storage. In one or more embodiments, the context analysis module (206) determines an encryption level based on one or more of the contextual factors. Possible combinations of contextual factors may include location data with device type, network conditions with time of day, user identity with application type, user behavior with location data, or any other combination of one or more contextual factors. Further, in one or more embodiments, the context analysis module (206) determines the storage location for the data. Storage choices include local storage, cloud storage, distributed storage or encrypted storage options. Further, the choice of storage location may be based on one or more of the contextual factors which may include the same or different contextual factors used to determine the encryption level.

In one or more embodiments, the encryption module (208) performs encryption operations, which includes encryption and decryption, on the data based on the determined encryption level. In one or more embodiments, the encryption module (208) employs various encryption techniques, such as hashing the data, salting the data, performing asymmetric encryption techniques and/or performing symmetric encryption techniques. Hashing the data may include producing a numeric value that is representative of the data or is a one-way encryption method to convert data into a fixed-size string of characters. Salting the data consists of adding random characters to the data, for example before hashing the data. Symmetric encryption techniques (e.g., Advanced Encryption Standard (AES), Data Encryption Standard (DES), International Data Encryption Algorithm (IDEA), etc.) generally use the same key for both encryption and decryption. Asymmetric encryption techniques (e.g., Rivest Shamir Adleman (RSA), Diffie-Hellman, ECC, etc.) generally use a public key for encryption and a private key for decryption.

In one or more embodiments, the SM storage (210) stores the encrypted data. In one or more embodiments, data may be stored in local storage (e.g., data storage on the user's device or a company server), cloud storage (e.g., data storage on a third-party cloud service), and/or distributed storage (e.g., data storage across multiple devices or servers), the choice of which may be based on the storage location determined by the context analysis module (206).

As used herein, "storage" refers to a hardware component that is used to store data. Storage may be a physical computer-readable medium. In most cases, storage may be configured as a storage array (e.g., a network attached storage array), in which a storage array may refer to a collection of one or more physical storage devices. Each physical storage device may include non-transitory computer-readable storage media, in which the data may be stored in whole or in part, and temporarily or permanently.

In one or more embodiments, the access control module (212) manages user access rights and permissions to ensure that only users associated with an appropriate user control level can decrypt and access the encrypted data. In one or more embodiments, the access control module (212) utilizes user authentication, in which users are required to provide valid credentials (e.g., username, password, and/or biometric scan) to access the encrypted data. In one or more embodiments, the access control module (212) utilizes encryption key management to ensure access to encryption keys is restricted to authorized personnel only. Further, in one or more embodiments, the access control module (214) applies authorization policies to ensure access to specific encrypted data can be granted or denied based on user roles, attributes or other contextual factors.

In one or more embodiments, the logger (214) records and maintains logs of system activities, encryption operations, and user access events for auditing purposes and security analysis. In one or more embodiments, the logger (214) maintains security of the system by logging access to the decrypted data, which may include logging the user, time, and location data associated with the access of the decrypted data and using auditing features (e.g., reviewing access logs and detecting unauthorized attempts to access data).

Figure 3A:
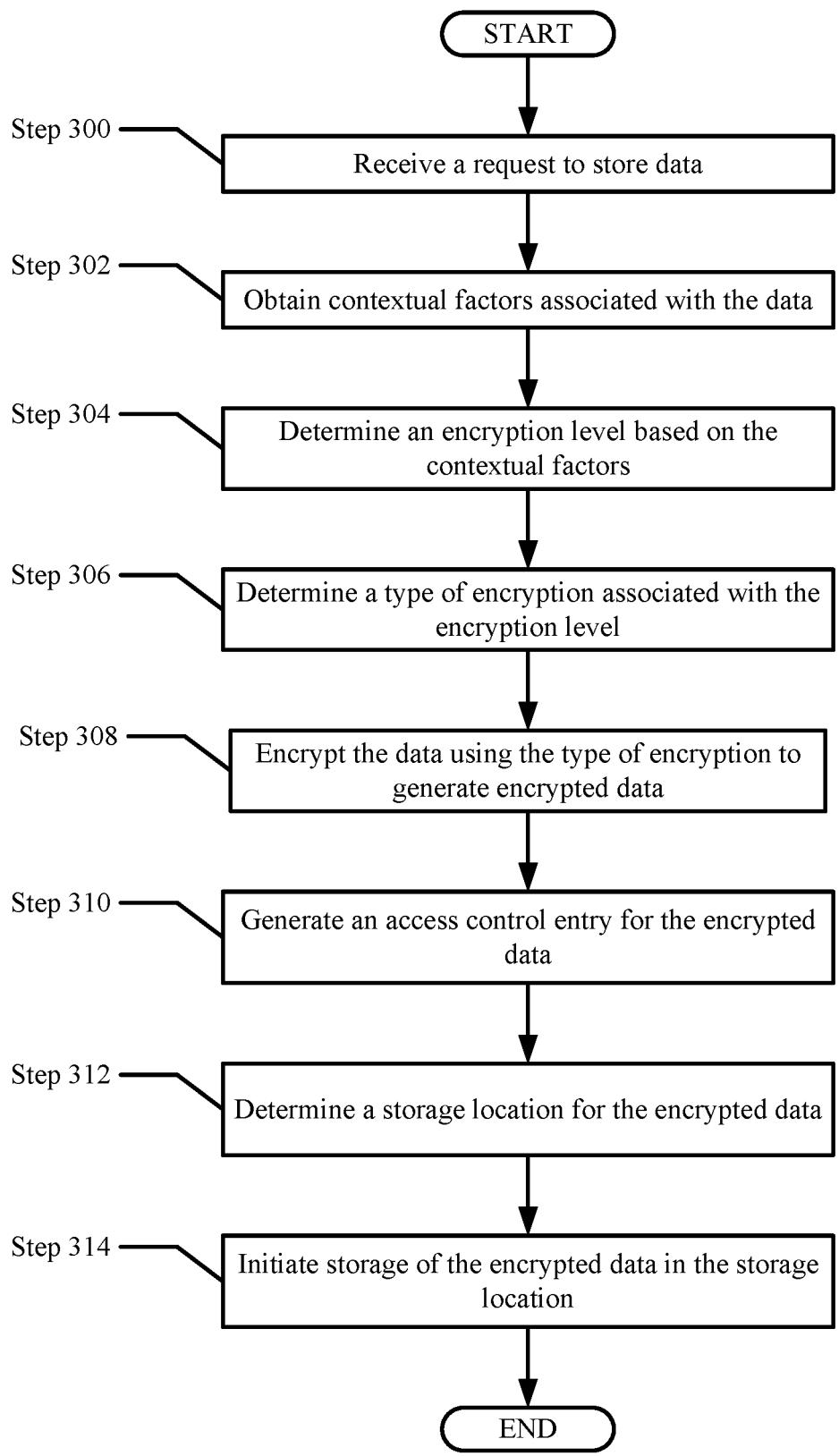
FIG. 3A shows a flowchart of a method for enhancing data security by using an encryption module in accordance with one or more embodiments.

FIG. 3A shows a method for enhancing data security in different contextual situations using a security module. Encryption techniques may use a fixed level of encryption that is insufficient to protect data from becoming compromised. As such, there exists a desire for a dynamic encryption technique. FIG. 3A shows a method for dynamically encrypting data based on contextual factors. In particular, the contextual factors associated with the data are used to determine an appropriate type of encryption. In doing so, the method provides a comprehensive solution to address the limitation of existing encryption methods by dynamically adjusting the level of encryption based on contextual factors. Further, the method provides improved user experiences, because the method optimizes computer performance by dynamically determining the type of encryption. The method is also capable of dynamically changing encryption levels based on the changes in contextual factors over time. As a non-limiting example, the encryption level will adjust automatically to provide a higher level of security when a user moves from a secure network to a public network.

While various steps in the method are presented and described sequentially, those skilled in the art will appreciate that some or all of the steps may be executed in different orders, may be combined or omitted, and some or all steps may be executed in parallel without departing from the scope of the embodiments disclosed herein.

Turning now to FIG. 3A, the method shown in FIG. 3A may be executed by, for example, the security module (e.g., 200, FIG. 2) discussed above. Other components of the system (e.g., 100, FIG. 1) illustrated in FIG. 1 may also execute all or part of the method shown in FIG. 3A without departing from the scope disclosed herein.

In Step 300, the security module receives a request to store data. In one or more embodiments, the request relates to data generated by a user input (e.g., a message or form submission), via a data collection device (e.g., a sensor (e.g., temperature, humidity, or other environmental conditions)) or data generated via data protection policies (e.g., logs (e.g., user logs or system logs), backups, or other data protection operations).

In Step 302, the security module obtains contextual factors associated with the data. In one or more embodiments, the factor collection module (e.g., 204, FIG. 2) is responsible for obtaining the contextual factors. In one or more embodiments, the contextual factors are obtained from a geolocation device, metadata, networking data, system information, analyzing user inputs, and/or analyzing any other parameter associated with the data. In one or more embodiments, contextual factors include one or more of the following: location data, device type, network conditions, user identity, time of day, application type, and user behavior. Location data includes the geographic location associated with the data, which may be determined via metadata associated with the data or by a location associated with a client device (e.g., 120, FIG. 1), which may be based on an internet protocol address or geolocation data. Device type includes the type of device being used (e.g., laptop, smartphone). Network conditions relate to the quality and/or reliability of the network connection, and may be based on signal strength, latency, and/or packet loss. User identity includes the identity of the user which may include a role of the user within an organization and/or the user access control level. Time of day includes the time of day when the data is generated. Application type includes the type of application being used. User behavior includes user behavior patterns, which may be based on a rate of data entry by a user and/or a timing of access by the user.

In Step 304, the security module determines an encryption level based on the contextual factors. The security module can determine an encryption level based on one or more contextual factors. For example, if the contextual factors represent a higher data sensitivity, the context analysis module will determine a higher encryption level. A lower encryption level indicates lower sensitivity, whereas a higher encryption level indicates higher sensitivity.

In one or more embodiments, combinations of contextual factors are used to determine an encryption level. In a first example, the level of encryption determined for a user operating a laptop at a military base may be a highest level of encryption. In a second example, the level of encryption determined for a system with a poor network connection accessed during normal working hours may be a lower level of encryption than the first example. In a third example, the level of encryption determined for a privileged user (e.g., administrators, security teams, a CEO), using an application related to financial matters may be a higher level of encryption than the second example. In a fourth example, the level of encryption determined for a user located in a public area with a high rate of data entry may be a lower level of encryption than the first example. The examples described above are not intended to limit the scope of the disclosure and are independent from any other examples discussed in this application.

In Step 306, the security module determines a type of encryption associated with the encryption level. For example, each encryption level may include multiple, different types of encryption, where each of the types of encryption at each encryption level provide similar levels of data protection. In such an example, any of the types of encryption associated with the determined encryption level may be selected in Step 306.

In Step 308, the security module encrypts the data using the type of encryption to generate encrypted data. In one or more embodiments, the encryption module (e.g., 208, FIG. 2) employs various encryption techniques, such as hashing the data, salting the data, performing asymmetric encryption techniques and/or performing symmetric encryption techniques.

In Step 310, the security module generates an access control entry for the encrypted data. In one or more embodiments, the access control entry manages user access rights and permissions to ensure that only users having the appropriate access control levels can decrypt and/or otherwise access the encrypted data (e.g., FIG. 3B). Further, the access control entry may include a minimum access control level which may be used to ensure only users having at least the minimum access control level can perform certain operations on the encrypted data such as decrypting and/or otherwise accessing the encrypted data.

In Step 312, the security module determines a storage location for the encrypted data. In one or more embodiments, the determination may be based on the level of encryption and/or one or more contextual factors. In one or more embodiments, the storage location may include one of local storage, cloud storage or distributed storage.

In Step 314, the security module initiates storage of the encrypted data in the storage location. In one or more embodiments, initiation of storage of the encrypted data includes sending the encrypted data to the storage location. The method may end following Step 314.

Figure 3B:
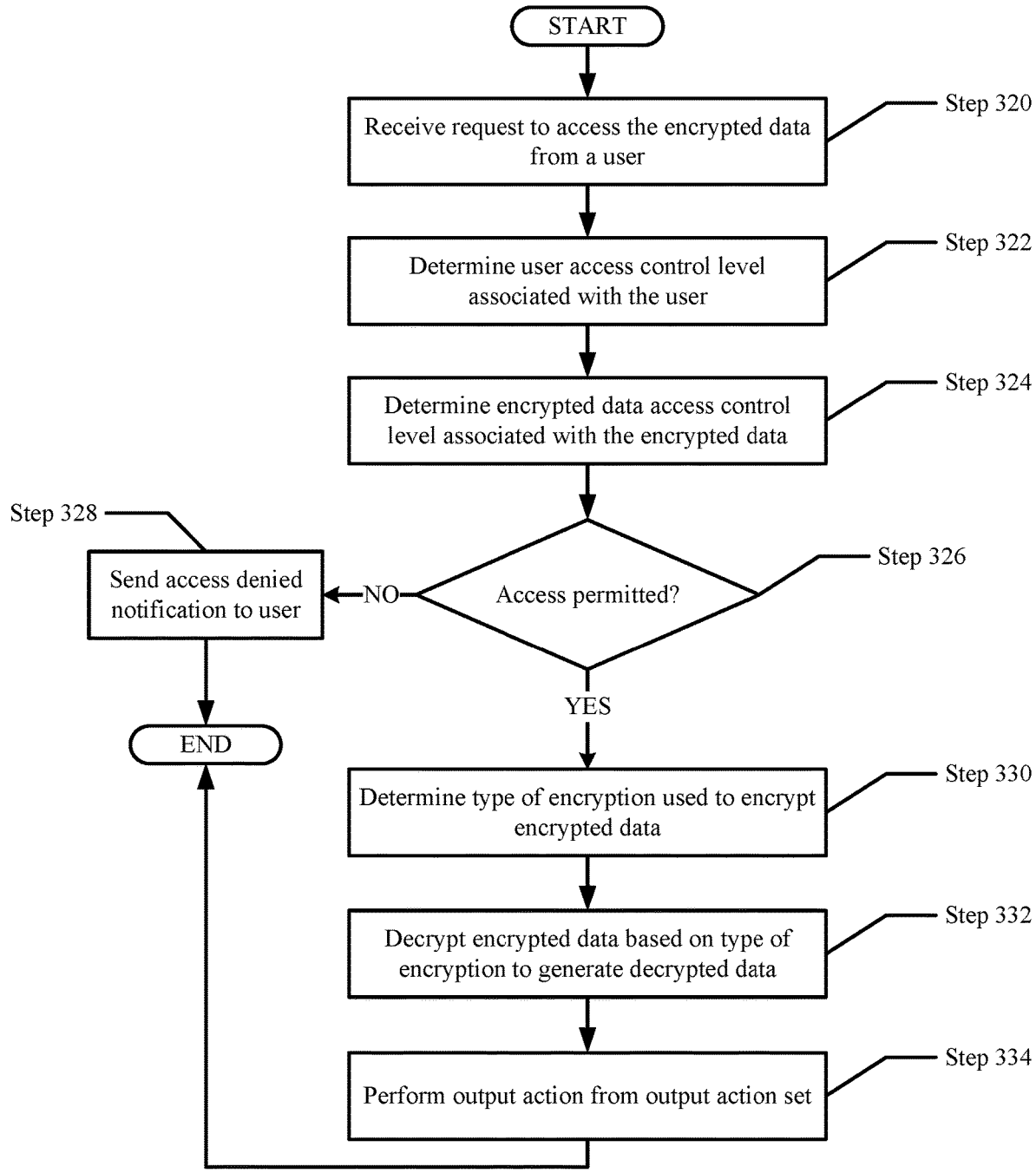
FIG. 3B shows a flowchart of a method for decryption in accordance with one or more embodiments.

FIG. 3B shows a method for decrypting the encrypted data. For example, when a user requests to access encrypted data, the security module will determine whether the user is authorized to access and decrypt the data. Further, when the security module determines the user has the appropriate access, the encrypted data is decrypted based on the type of encryption used to encrypt the encrypted data. In doing so, the method enhances data security and provides data protection by enabling the safe transmission and storage of data. Additionally, the method maintains confidentiality by ensuring that only authorized users can access or regain access to the encrypted data.

While various steps in the method are presented and described sequentially, those skilled in the art will appreciate that some or all of the steps may be executed in different orders, may be combined or omitted, and some or all steps may be executed in parallel without departing from the scope of the embodiments disclosed herein.

Turning now to FIG. 3B, the method shown in FIG. 3B may be executed by, for example, the security module (e.g., 200, FIG. 2) discussed above. Other components of the system (e.g., 100, FIG. 1) illustrated in FIG. 1 may also execute all or part of the method shown in FIG. 3B without departing from the scope disclosed herein.

In Step 320, the security module receives a request to access the encrypted data from a user. In one or more embodiments, the security module receives the request by a user input requesting access to the encrypted data or receiving an indication for a user attempting to access the encrypted data. In one or more embodiments, the request to access includes one of reading and/or writing the encrypted data in encrypted form, decrypting the data, or viewing characteristics of the encrypted data and/or metadata associated with the encrypted data.

In Step 322, the security module determines the user access control level associated with the user. In one or more embodiments, the user access control level is defined and associated with the user and the security module directly identifies the defined user access control level. In one or more embodiments, the security module stores a database of users and their associated user access control level and determines the user access control level by performing a lookup in the database. In one or more embodiments, the security module analyzes the user's identity and/or role within an organization associated with the user to determine the user access control level. In one or more embodiments, the user access control level is based on user authentication, in which a user provides valid credentials (e.g., username, password, and/or biometric scan) to provide their user control level.

In Step 324, the security module determines the encrypted data access control level associated with the encrypted data. In one or more embodiments, the security module utilizes the encryption level associated with the encrypted data to determine the encrypted data access control level associated with the encrypted data. In one or more embodiments, the security module utilizes an access control entry (e.g., the access control entry generated in Step 310) to determine the encrypted access control level.

In Step 326, the security module makes a determination as to whether the user has permitted access to the encrypted data. For example, when the user access control level is less than the encrypted data access control level, the user is denied access. Further, when the user access control level is greater than or equal to the encrypted data access control level, the user is permitted access.

In one or more embodiments, if it is determined that access is permitted, then the method proceeds to Step 330. In one or more embodiments, if it is determined that access is not permitted, then the method proceeds to Step 328.

In Step 328, the security module sends an access denied notification to the user. In one or more embodiments, the user interface module (e.g., 202, FIG. 2) displays a message to the user that access to the encrypted data has been denied.

The method may end following Step 328.

In Step 330, the security module determines the type of encryption used to encrypt the encrypted data. The encryption module (e.g., 208, FIG. 2) employs various encryption techniques, such as hashing the data, salting the data, performing asymmetric encryption and/or performing symmetric encryption.

In Step 332, the security module decrypts the encrypted data based on the type of encryption determined in Step 330 to generate decrypted data. The steps taken to decrypt the encrypted data are based on the type of encryption and may include hash verification, salting and hashing verification, symmetric key decryption and/or asymmetric key decryption. Hash verification includes the hashed data being compared to a stored hash to verify its authenticity. Salting and hashing verification includes the salted data being hashed and compared to a stored has to verify its authenticity. Symmetric key decryption includes the same shared key used to encrypt the data being used to decrypt the data. Asymmetric key decryption includes the private key corresponding to the public key used to encrypt the data being used to decrypt the data.

In Step 334, the security module performs an output action from an output action set. The output action set includes at least one of providing access to the decrypted data, transferring the decrypted data to another storage location as may be specified by the user, and logging access to the decrypted data, which may include logging the user, time, and location data associated with the access of the decrypted data.

The method may end following Step 334.

Figure 4:
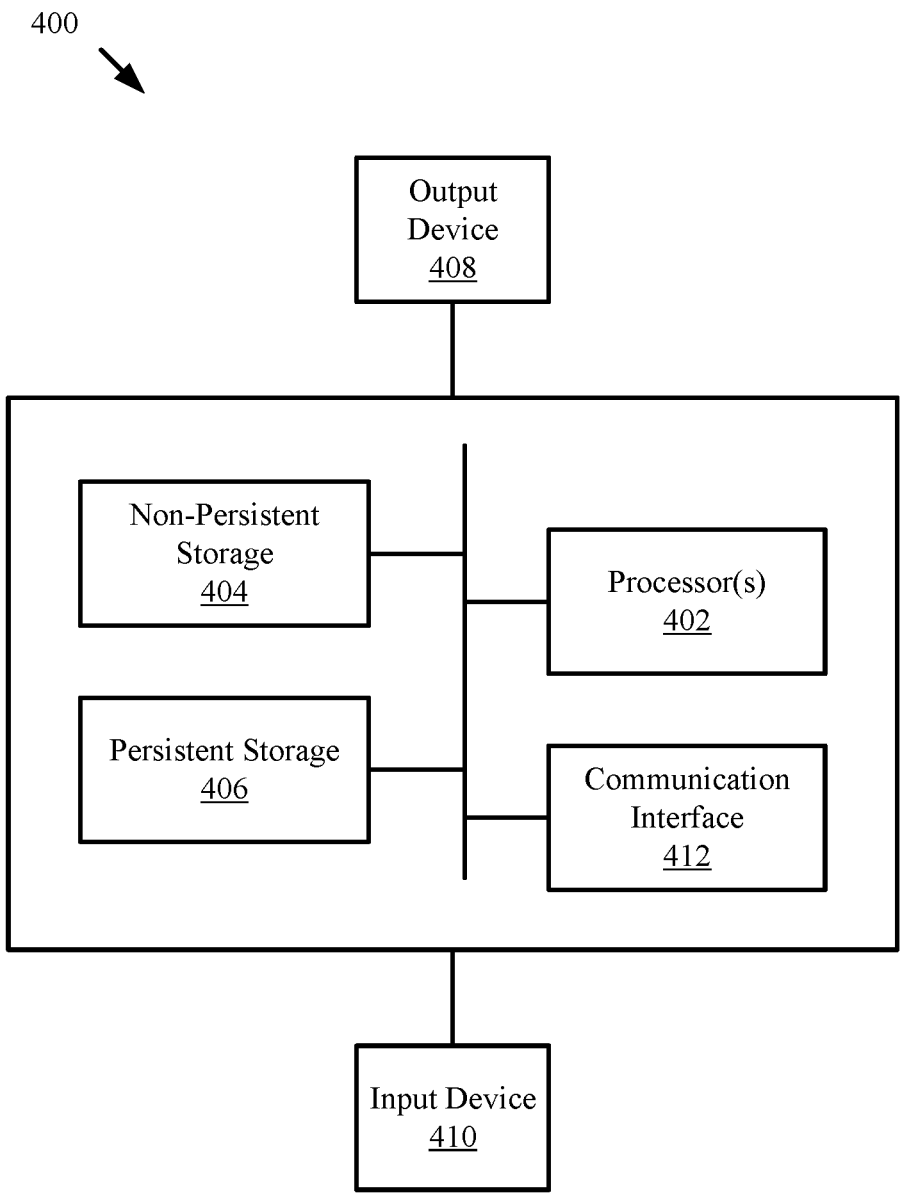
FIG. 4 shows a diagram of a computing system in accordance with one or more embodiments.

Turning to FIG. 4, FIG. 4 shows a diagram of a computing system in accordance with one or more embodiments.

In one or more embodiments, the computing device (400) may include one or more processor(s) (402), non-persistent storage (404), persistent storage (406), an output device (408), an input device (410), and a communication interface (412). Each of these components is described below.

In one or more embodiments, the processor(s) (402) may be an integrated circuit for processing instructions. For example, the processor(s) (402) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (e.g., Internet, mobile network, etc.) and/or to another device, such as another computing device.

In one or more embodiments, the computing device (400) may include one or more output devices (408), such as a screen (e.g., a liquid crystal display (LCD), plasma display, touchscreen, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

The problems discussed throughout this application should be understood as being examples of problems solved by embodiments described herein, and the various embodiments should not be limited to solving the same/similar problems. The disclosed embodiments are broadly applicable to address a range of problems beyond those discussed herein.

While embodiments discussed herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for enhancing data security, the method comprising:
   receiving data;
   obtaining a plurality of contextual factors associated with the data, wherein the contextual factors comprises user location, device type, network conditions, user identity, time of day, application type, and user behavior, wherein user behavior comprises a rate of data entry by a user of the device and a timing of access by the user of the device;
   determining an encryption level based on at least one of the contextual factors;
   determining a type of encryption based on the encryption level;
   encrypting the data using the type of encryption to generate encrypted data;
   associating an access control level with the encrypted data to generate associated encrypted data;
   determining a storage location for the associated encrypted data based on the encryption level, wherein determining the storage location is based on a data sensitivity associated with the data or a compliance rule; and
   sending the associated encrypted data to the storage location.

2. A method for enhancing data security, the method comprising:
   receiving data;
   obtaining a plurality of contextual factors associated with the data,
      wherein the contextual factors comprises user location, device type, network conditions, user identity, time of day, application type, and user behavior,
      wherein user behavior comprises a rate of data entry by a user of the device and a timing of access by the user of the device;
   determining an encryption level based on at least one of the contextual factors;
   determining a type of encryption based on the encryption level;
   encrypting, by an encryption module on a device, the data using the type of encryption to generate encrypted data;
   associating an access control level with the encrypted data;
   determining a storage location for the encrypted data based on the encryption level; and
   initiating sending of the encrypted data to the storage location.

3. The method of claim 1, wherein user location is based on an Internet Protocol address or geolocation data associated with the device.

4. The method of claim 1, wherein the network conditions are based on at least one of signal strength, latency, and packet loss experienced by the device.

5. The method of claim 2, wherein encrypting the data comprises at least one of hashing the data, salting the data, performing asymmetric encryption and performing symmetric encryption.

6. The method of claim 2, wherein only a user of the device associated with at least the access control level has access to decrypt the data.

7. The method of claim 2, wherein determining the storage location is based on data sensitivity associated with the data or a compliance rule.

8. The method of claim 2, wherein the storage location comprises local storage, cloud storage, or distributed storage.

9. A method for enhancing data security using an encryption module, the method comprising:
   receiving data;
   obtaining a plurality of contextual factors associated with the data,
      wherein the contextual factors comprises user location, device type, network conditions, user identity, time of day, application type, and user behavior,
      wherein user behavior comprises a rate of data entry by a user and a timing of access by the user;
   determining an encryption level based on at least one of the contextual factors;
   determining a type of encryption based on the encryption level; and
   encrypting the data using the type of encryption to generate encrypted data.

10. The method of claim 9, further comprising:
    associating an access control level with the encrypted data to generate associated encrypted data;
    determining a storage location for the associated encrypted data; and
    initiating sending of the associated encrypted data to the storage location.

11. The method of claim 10, wherein only a user associated with at least the access control level has access to decrypt the data.

12. The method of claim 10, wherein determining the storage location is based on data sensitivity associated with the data or a compliance rule.

13. The method of claim 10, wherein the storage location comprises local storage, cloud storage, or distributed storage.

14. The method of claim 9, wherein user location is based on an internet protocol address or geolocation data.

15. The method of claim 9, wherein the network conditions are based on at least one of signal strength, latency, packet loss.

16. The method of claim 9, wherein encrypting the data comprises at least one of hashing the data, salting the data, performing asymmetric encryption and performing symmetric encryption.

* * * * *